United States Patent [19]

Spilker et al.

[11] Patent Number: 4,713,199
[45] Date of Patent: Dec. 15, 1987

[54] DEPOSITORY FOR RADIOACTIVE WASTE AND SPENT FUEL CELLS

[76] Inventors: Harry Spilker, Talstrasse 3, D-3252 Bad Münder 2; Rainer Rox, Grethenweg 68, D-6000 Frankfurt/M. 70; Heinz-Walter Peschl, Die Ritterwiesen 8, D-6237 Liederbach, all of Fed. Rep. of Germany

[21] Appl. No.: 889,638

[22] Filed: Jul. 28, 1986

Related U.S. Application Data

[63] Continuation of Ser. No. 699,082, Feb. 7, 1985, abandoned.

[30] Foreign Application Priority Data

Feb. 8, 1984 [DE] Fed. Rep. of Germany ....... 3404329

[51] Int. Cl.[4] .......................... G21F 9/12; G21F 9/24; G21F 5/00
[52] U.S. Cl. .................................. 252/633; 250/506.1; 250/507.1; 252/628; 376/272; 376/448
[58] Field of Search ........................ 252/633, 626, 628; 250/506.1, 507.1; 376/261, 272, 448; 210/747

[56] References Cited

U.S. PATENT DOCUMENTS

| | | | |
|---|---|---|---|
| 3,046,403 | 7/1962 | Montgomery | 250/507.1 |
| 3,175,087 | 3/1965 | Aupetit et al. | 250/507.1 |
| 4,177,386 | 12/1979 | Wachter et al. | 252/633 |
| 4,229,316 | 10/1980 | Baatz et al. | 252/633 |
| 4,366,114 | 12/1982 | Kühnel | 250/506.1 |
| 4,400,344 | 8/1983 | Wachter et al. | 250/506.1 |
| 4,415,459 | 11/1983 | Coffman et al. | 252/633 |
| 4,513,205 | 4/1985 | Splinter | 250/507.1 |
| 4,535,250 | 8/1985 | Fields | 250/507.1 |

FOREIGN PATENT DOCUMENTS

| | | | |
|---|---|---|---|
| 3028006 | 2/1982 | Fed. Rep. of Germany | 252/633 |
| 2129190 | 5/1984 | United Kingdom | 252/633 |

Primary Examiner—Stephen J. Lechert, Jr.
Assistant Examiner—Howard J. Locker
Attorney, Agent, or Firm—Allegretti, Newitt, Witcoff & McAndrews

[57] ABSTRACT

The invention concerns a depository for radioactive waste and spent fuel cells comprising a concrete storage block in which several vertical storage and cooling channels are provided for accommodating the radioactive waste and the fuel cells. In order to provide an improved and safer concrete depository vis-a-vis the state of the art, the storage block is composed of several concrete blocks disposed beside and above one another. In the concrete blocks there are several vertical channels. The aligned channels of several concrete blocks placed on top of one another form storage and cooling channels for accommodating tubular storage containers for the radioactive waste and radioactive spent fuel cells. An annular gap is left for cooling air between the outer wall of the storage containers and the inner wall of the storage and cooling channels.

19 Claims, 5 Drawing Figures

DEPOSITORY FOR RADIOACTIVE WASTE AND SPENT FUEL CELLS

This application is a continuation of application Ser. No. 699,082, filed Feb. 7, 1985 abandoned.

The invention concerns a depository, particularly a dry depository, for radioactive waste and spent fuel cells comprising a concrete storage block having cooling channels for circulation of air to remove residual heat from the stored waste.

In the storing of such materials, particularly temporary storage of spontaneously-heating radioactive materials, care must be taken to prevent the release of radioactive substances due to overheating.

Depositories for the dry storage of spontaneously-heating radioactive materials have been disclosed in which the storage material is packed in containers and the containers are inserted into vertical tubular shafts, whose floor consists of the grid of a storage rack. The storage rack is made of steel and is located in a shielded storage cell. The depository has several storage cells. The cooling of the containers heated by residual heat is provided by natural convection. For this purpose, an annular gap is left between container and storage shaft. Atmospheric air as cooling air enters through an air supply opening under the storage rack, picks up heat while passing through the annular gap and flows through an exhaust opening to the environment. The space underneath the storage rack serves as an air supply chamber for the stabilizing and uniform distribution of the cooling air in the storage shafts. The space above the storage rack serves as a used air chamber. The cooling air is fed from the outside via air supply openings in the air supply shafts. The air supply openings are above ground and lead at an angle upward into the air supply shafts. The air supply openings and also the exhaust openings are so made and equipped that rain, dust, etc., are prevented from entering. In these known depositories the disadvantages are the relatively big constructional expense and the associated high costs.

It is also a known practice to use monolithic concrete blocks with cast vertical channels instead of the storage rack and shafts of steel, for accommodating the radioactive materials. Because of the temperature differences and variations that occur, there is the danger of damage to the concrete block, since there is no compensation for thermal tensions. The construction of the known depository is relatively expensive. Dismantling is possible only with great expense.

The object of the present invention is to provide an improved and safer concrete depository having a storage block composed of concrete blocks with vertical channels therethrough, the blocks being piled up in adjacent rows with the channels aligned. The present fuel cells are disposed within the channels with an annular space surrounding them for cooling air.

The embodiment of the invention actually provides for a structure on the modular construction principle. The individual small concrete block units are easily and cheaply produced. They are easily installable for the building of the storage blocks and correspondingly easily removable. The storage block can be built up by sections. The embodiment of the invention leads to an improved and more efficient natural cooling of the material stored in the channels. The cooling air flows upward in the channels of the concrete block as in a chimney. A blower is not necessary. The natural draft is sufficient and provides an inherently safe cooling system. The construction with individually-combined concrete blocks avoids harmful thermal tensions in the storage block as a whole. The depository of the invention is thus inherently safe in this respect, also.

In one form of the invention the blocks rest on ribs projecting above the concrete floor or base, and the spaces between the ribs provide conduits which communicate with the vertical channels in the blocks for air circulation.

In another form of the invention, the metal storage containers for the radioactive waste and spent fuel cells have radial ribs along their length to conduct heat to the cooling air passing through the vertical channels. An increase in seismic security is achieved by bracing the stacked individual concrete blocks against the base plate and bracing the containers against blocks. The metal storage containers may be suspended within the channels of the concrete blocks with the use of supports resting on the top of the stack. This has the advantage that the longer part of the storage container beneath the support can expand freely and unhindered downwardly without any harmful forces being exerted on any structural part.

By providing air filters in the air inlet openings, dust, micro-organisms, etc., are prevented from getting into the depository.

In a preferred form of the invention the individual blocks have on their tops and bottoms mating centering elements to facilitate the stacking and arrangement of the concrete blocks.

A sealing sleeve is provided for sealing off from the environment the upper part of the storage and cooling channels or the opening in the concrete ceiling. The sleeve can accommodate itself to thermal movements of the portion of the storage container extending into the opening in the concrete ceiling.

Preferably the upper end of the storage container is enlarged and has an annular shoulder which rests on a cooperating ledge in the opening through the ceiling. A shielding plug fits in the enlargement.

In order to secure the optimum protection against the penetration of water, especially ground water, into the depository, a water sensing means is provided to monitor the presence of water and actuate a pump. Water is thereby prevented from getting into the space underneath the storage blocks and into the storage and cooling channels and interfering with or interrupting the natural draft cooling.

The invention will now be explained in more detail with reference to the attached drawings.

Figure 1:
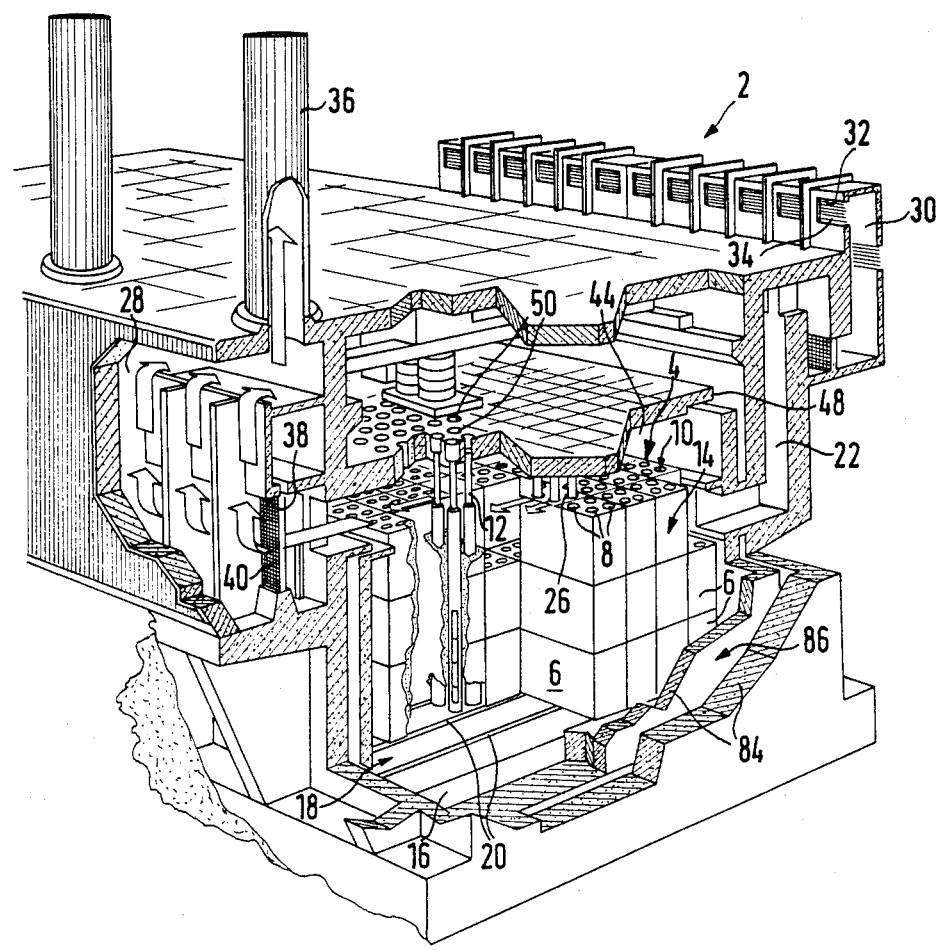
FIG. 1 is a perspective schematic view, partially broken away, of a part of a depository constructed according to the invention.
Figure 2:
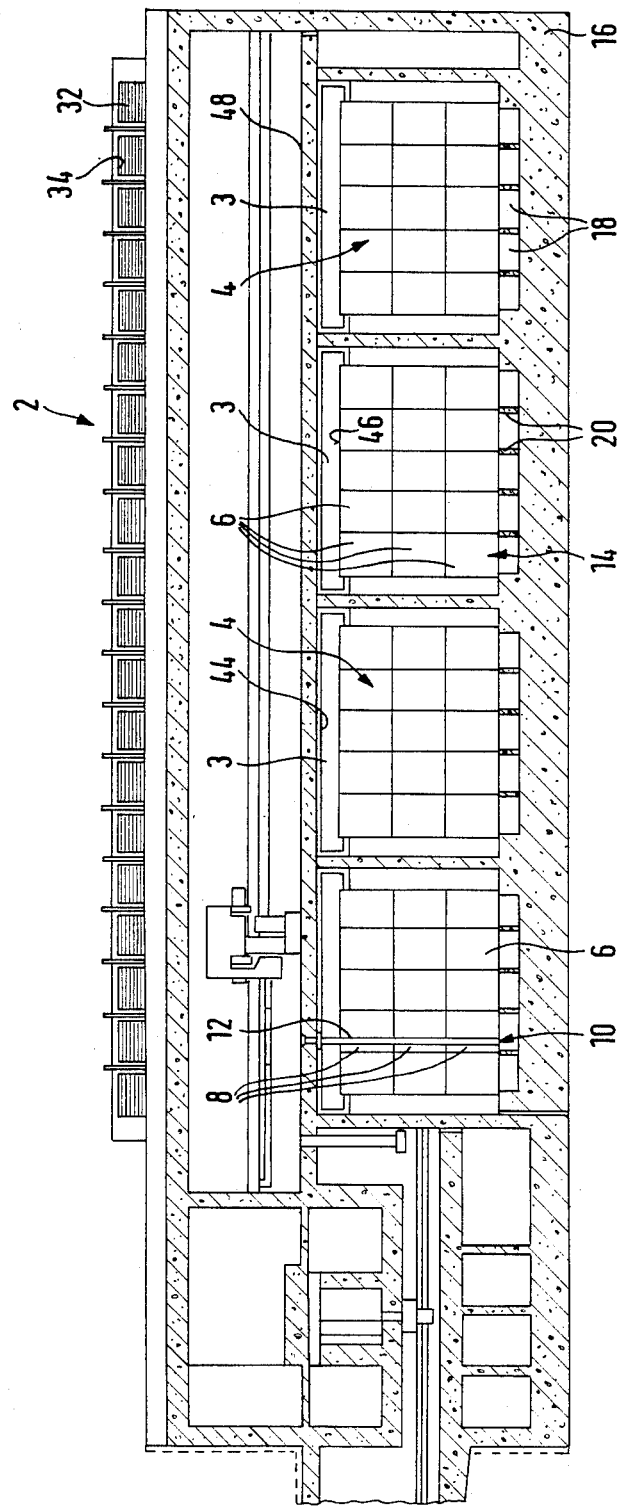
FIG. 2 is a longitudinal section through the depository shown in FIG. 1.

The drawing shows a depository 2 for dry storage especially interim storage, of spontaneously-heating radioactive waste and spent fuel cells. In the actual storage area there are separate storage rooms or cells 3 containing storage blocks 4 of concrete, which are made up of individual concrete blocks 6, in which several channels 8 (in FIG. 1 four channels are shown) are formed. The concrete blocks are stackable so that the channels are aligned with one another and form vertical cooling and storage channels 10 for the accommodation of tubular storage containers 12 of metal for the storage of residual heat-producing radioactive material.

Several stacked concrete blocks 6 form a block segment 14. Several block segments 14 form a storage block 4.

Figure 3:
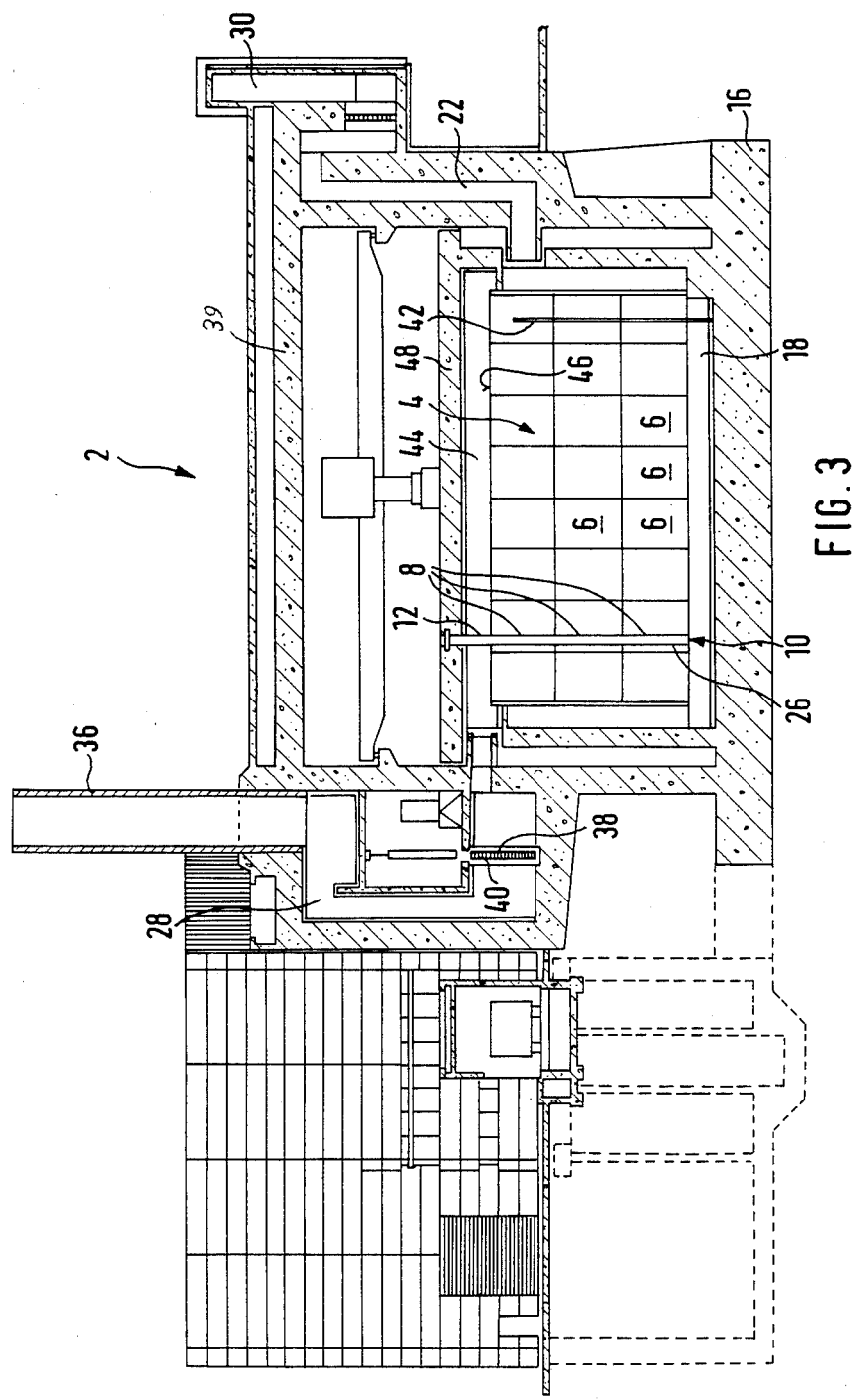
FIG. 3 is a cross-section through the depository shown in FIG. 1.

Each storage block 4 stands on a concrete base plate 16 which has transverse running cooling air channels 18 which here are formed between ribs or low walls 20 formed on the base plate 16. The cooling air channels 18 are connected with the air supply channels 22 (FIG. 3).

Between the storage containers 12 and the inner wall of the channels 10 there is an annular gap 26 which connects with the cooling air channels 18.

At their tops, the cooling and storage channels 10 open into an intermediate space 44 which connects to an exhaust air channel 28 through which the cooling air warmed in the depository is led off.

The cooling air is supplied via shafts 30 whose inlet opening 32 is provided with filters 34 to pick up dust, micro-organisms, etc.

The warmed air is exhausted via shafts or chimneys 36, the outlet openings 38 likewise being equipped with filters 40.

The individual block segments 14 can, as shown schematically in FIG. 3, be braced by mean of bracing elements 42 on the base plate 16 to enhance the seismic security.

Figure 5:
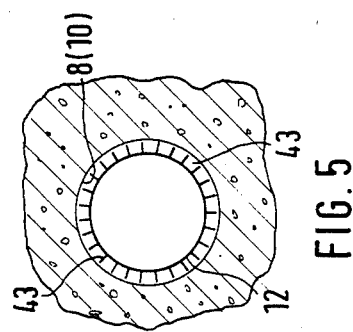
FIG. 5 is a section A—A through the storage container represented in FIG. 4.

The outer surface of the tubular storage containers 12 can also be provided with longitudinal ribs 43 (FIGS. 4 and 5) as cooling ribs to improve the heat dissipation. These cooling ribs 43 are preferably so designed that they at the same time serve as spacers for establishing the annular gap 26. With this design, additional spaces can be dispensed with.

Cooling takes place through the air current produced by natural convection. In the annular gap 26 the air is heated and rises as in a chimney. The colder outside air flows in through the shafts 30 as cooling air.

The actual storage area of the depository 2 is closed at the top by a concrete ceiling 48. Between the upper side 46 of the storage blocks 4 and the lower side of the concrete ceiling 48, an intermediate space 44 is left which at the same time constitutes a first more or less horizontally-running section of the exhaust air channels 28.

Figure 4:
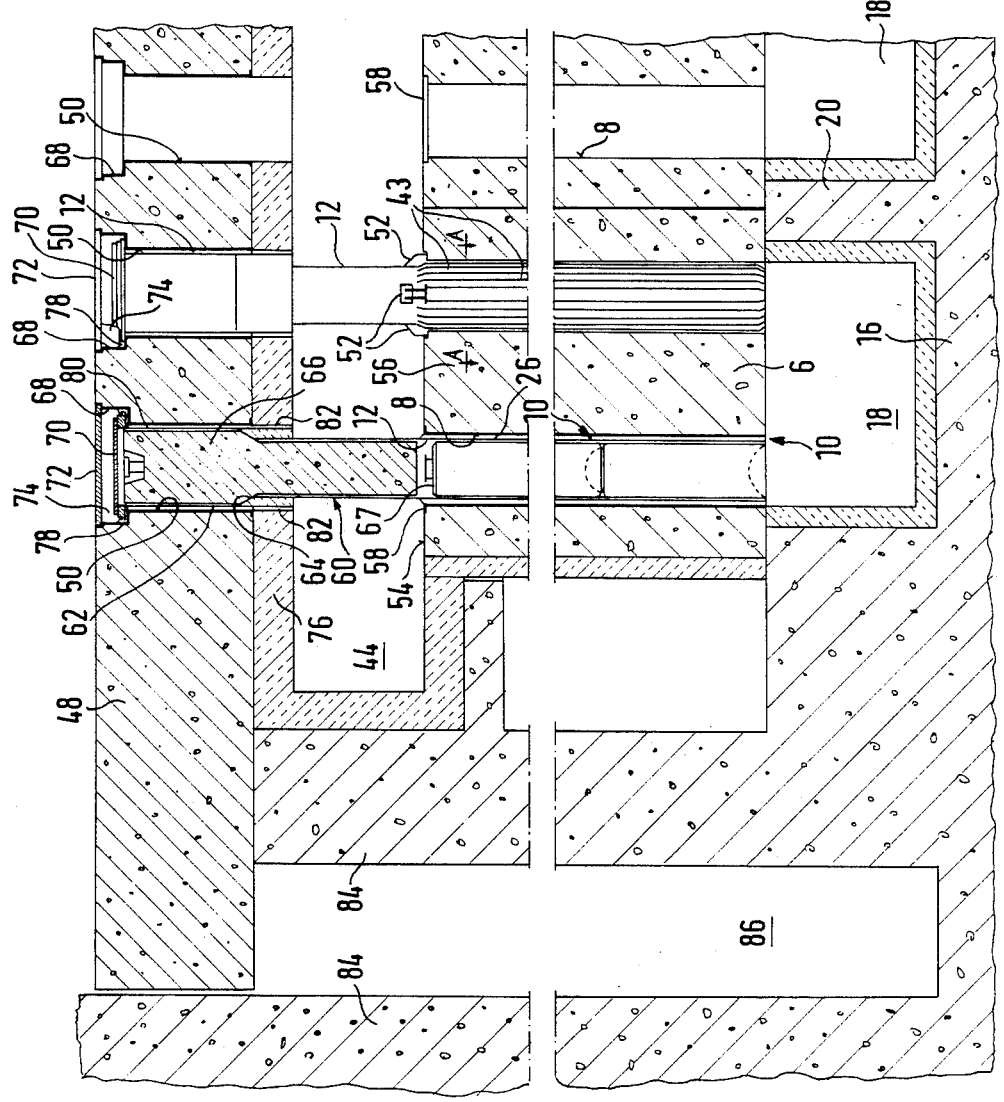
FIG. 4 is a detailed cross-sectional representation of a part of the depository according to the invention.

As shown in FIG. 4, the concrete ceiling 48 has openings 50 that are in line with the storage and cooling channels 10 of the storage blocks 4. Through these openings the tubular storage containers 12 can be inserted into and withdrawn from the channels.

The space between the underside of the concrete blocks 4 and the baseplate, that is to say, the size of the cooling air channels 18, is such that this space or the cooling air channels constitute an air feed distribution space through which the incoming air is stabilized and uniformly distributed to the annular gaps. Likewise, the space between the top side of the storage blocks 4 and the underside of the concrete ceiling is of such a size that it serves as an exhaust air space for the more uniform carrying off of the heated cooling air.

The tubular storage containers 12 are provided on their outer side with several supports 52 in the form of radial arms that are distributed around the circumference (see FIG. 4, which shows a storage container with four evenly distributed supports). With these supports the storage containers are supported on the tops 54 of the top concrete blocks 56. Preferably they rest on recesses in the top 54 that in the represented embodiment have the form of annular enlargements of the top end of the channel 8. The recesses can, of course, be made individually, for example, as steps distributed around the channel end, depending on the arrangement of the supports.

The upper part 60 of the storage container is enlarged in the area of the concrete ceiling 48, so that an annular shoulder or an annular transition surface 64 is formed between tube enlargement 62 and the part of the storage container under it.

Into the upper part 60 of the storage container 12 there is inserted a concrete plug 66 that extends down almost to the material being stored which, in FIG. 4 for example, consists of several stacked blass ingots 67. The cross-sectional shape of the plug 66 matches that of the top of the storage container, so that the plug rests on the annular shoulder 64.

The upper end of the storage container 12, extending a little above the plug 66, extends into a cylindrical enlargement 68 of the opening 50 and is closed by means of a cover 70.

The enlargement 68 of the opening 50 provided with a top cover 72 that is spaced above the cover 70.

In the cylindrical enlargement 68 there is also a sealing sleeve or ring 74 for sealing off the opening or the annular gap 26,80 of channel 10 against the environment. The sealing sleeve 74 is, on the one hand, inserted between storage container cover 70 and storage container 12 and, on the other hand, between top cover 72 and the wall of the enlargement 68. The sealing sleeve permits vertical movement of the part of the storage container above the support 52 due to thermal expansion without any sealing problems.

The storage cells 3 are lined on the inside with an insulation 76. The size of the spaces 78 under the sealing sleeves 74 change with the thermal expansion of the storage container and thus with the change in position of the sealing sleeve.

The depository 2 has a double-shell external wall 84. The space 86 between the two walls, which are made of concrete, is monitored for the penetration of water, especially of ground water. Any water that gets in is removed by pumps actuated by the monitoring means.

We claim:

1. Modular-system depository for dry storage of radioactive waste containers and spent fuel cells comprising a concrete storage block on a concrete base, said concrete storage block containing vertical channels for storing and cooling said radioactive waste and fuel cells, and a cover, said storage block being composed of a plurality of individual concrete blocks each having a plurality of vertical storage and cooling channels extending therethrough, said concrete blocks being stacked beside and on top of one another with said vertical channels in alignment, at least one said container or fuel cell being disposed in each said channel, said concrete blocks having said channels being arranged in essentially equal modular grids and having the same dimensions, a plurality of stacked concrete blocks forming a block segment and a plurality of block segments forming a storage block, said block segments being spaced from said concrete base, the spaces between the bottom of the block segments and the concrete base forming intake air conduits communicating with said vertical storage and cooling channels.

2. Depository of claim 1 which includes a concrete base plate having ribs projecting above the surface thereof to provide an air supply space between the ribs in communication with said vertical storage and cooling channels, said ribs serving to support the said storage block in a position above said base.

3. Depository of claim 1 in which each said storage container or fuel cell is spaced from the inner wall of said vertical channel to provide an annular gap for cooling air.

4. Depository of claim 3 in which said storage container has axial ribs to facilitate cooling.

5. Depository of claim 2 which includes bracing elements to brace the stacked blocks against said base plate.

6. Depository of claim 1 which includes supply and discharge ducts having filters.

7. Depository of claim 1 in which said individual concrete blocks have on their top and bottom stacking surfaces mating centering elements.

8. Depository of claim 1 which includes a concrete ceiling spaced above said storage block to form an intermediate space, which space communicates with a discharge duct.

9. Depository of claim 8 in which said storage containers are tubular and said concrete ceiling contains openings aligned with said vertical channels to permit insertion of said tubular storage containers into said vertical channels.

10. Depository of claim 1 in which each said storage container is suspended within a vertical channel by means of radial arms extending from said container and resting on the top side of the uppermost concrete block.

11. Depository of claim 10 in which the ends of said radial arms rest in recesses in said top side of said uppermost block.

12. Depository of claim 9 in which said openings in said concrete ceiling are enlarged at their upper ends to provide an annular shoulder and the upper ends of said tubular storage containers are similarly enlarged so that they fit within said enlarged openings.

13. Depository of claim 12 which includes a concrete plug within said enlarged portion of said storage container, said plug having the same cross-sectional configuration as said enlarged portion.

14. Depository of claim 13 in which said storage container extends above the top of said plug and carries a cover.

15. Depository of claim 14 in which said storage container is spaced from the wall of said enlarged opening to form an annular space and includes a sealing sleeve disposed between said container cover and the upper edge of said container.

16. Depository of claim 1 in which said blocks are enclosed in cells, the walls, floor and ceiling of which are provided with insulation.

17. Depository of claim 1 in which the outside walls thereof are double shelled.

18. Depository of claim 17 which includes means disposed between said shell walls for monitoring the presence of water and a pump responsive to said monitoring means.

19. Depository of claim 4 in which said axial ribs also serve to space said storage container from the inner wall of said vertical channel.

* * * * *

UNITED STATES PATENT AND TRADEMARK OFFICE
CERTIFICATE OF CORRECTION

PATENT NO. : 4,713,199

DATED : December 15, 1987

INVENTOR(S) : Harry Spilker, Rainer Rox and Heinz-Walter Peschl

It is certified that error appears in the above-identified patent and that said Letters Patent is hereby corrected as shown below:

On the Title Page, add Item [73] Assignee: Deutsche Gesellschaft fur Wiederaufarbeitung von Kernbrennstoffen mbH, of Hannover West Germany.

Signed and Sealed this

Twenty-sixth Day of July, 1988

*Attest:*

DONALD J. QUIGG

*Attesting Officer*   *Commissioner of Patents and Trademarks*